United States Patent
Hartman

(10) Patent No.: US 11,330,436 B1
(45) Date of Patent: May 10, 2022

(54) SECURE TWO-WAY COMMUNICATIONS

(71) Applicant: Prodigy Solutions Inc., Mount Laurel, NJ (US)

(72) Inventor: James B. Hartman, Moorestown, NJ (US)

(73) Assignee: PRODIGY SOLUTIONS INC., Mount Laurel, NJ (US)

( * ) Notice: Subject to any disclaimer, the term of this patent is extended or adjusted under 35 U.S.C. 154(b) by 422 days.

(21) Appl. No.: 16/679,214

(22) Filed: Nov. 10, 2019

(51) Int. Cl.
| | |
|---|---|
| *G06F 7/04* | (2006.01) |
| *G06F 15/16* | (2006.01) |
| *H04L 29/06* | (2006.01) |
| *H04W 12/08* | (2021.01) |
| *H04W 76/11* | (2018.01) |
| *G06F 16/22* | (2019.01) |
| *H04W 12/02* | (2009.01) |
| *H04W 4/33* | (2018.01) |

(52) U.S. Cl.
CPC ............ *H04W 12/08* (2013.01); *G06F 16/22* (2019.01); *H04W 4/33* (2018.02); *H04W 12/02* (2013.01); *H04W 76/11* (2018.02)

(58) Field of Classification Search
USPC .......................................................... 726/4
See application file for complete search history.

(56) References Cited

U.S. PATENT DOCUMENTS

| | | | |
|---|---|---|---|
| 9,094,500 B1 * | 7/2015 | Edwards ................. | H04M 3/38 |
| 2013/0058469 A1 * | 3/2013 | Gongaware .......... | H04M 3/4211 |
| | | | 379/93.03 |
| 2014/0253322 A1 * | 9/2014 | Chapin .............. | G08B 21/0227 |
| | | | 340/539.11 |
| 2014/0334610 A1 * | 11/2014 | Hangsleben ........ | H04M 1/2477 |
| | | | 379/85 |

* cited by examiner

*Primary Examiner* — Jeffrey C Pwu
*Assistant Examiner* — Samuel Ambaye
(74) *Attorney, Agent, or Firm* — Hodgson Russ LLP

(57) ABSTRACT

A system and method for enabling two-way communication between a residents of a secure facility (inmate, patient, suspect, etc.) and outside parties shares a limited number of telephone numbers (ANIs) by creating distinct communication channels using other data in addition to the shared ANIs.

14 Claims, 11 Drawing Sheets

SECURE TWO-WAY COMMUNICATIONS

FIELD OF THE DISCLOSURE

The present disclosure relates generally to the field of communication systems in secure facilities such as correctional institutions, jails, prisons, mental hospitals, or similar facilities. More particularly, the disclosure relates to a system and method for enabling two-way communication between a resident of a secure facility (inmate, patient, suspect, etc.) and an outside party utilizing system logic to create communication channels transported over a shared set of telephone numbers.

BACKGROUND OF THE DISCLOSURE

Communication between individuals housed in facilities such as prisons, jails, mental hospitals, etc. and the outside world is well known. Such communications create many security concerns. A law enforcement agency would not want to permit a person accused of a violent crime to communicate with his or her victim, commit witness tampering, harassment etc. In addition, monitoring and recording is commonly employed so law enforcement may use such communications as evidence for pending criminal investigations.

A typical secure communication system in a secure facility employs the use of a standard analog telephone enclosed in a stainless-steel housing. These devices are tamper resistant and prevent vandalism of the devices. Common communication systems employed in secure facilities are largely based on outbound only traditional telephone calls. Policies and procedures in secure facilities severely restrict the ability for residents to communicate. It is common to limit the number of attempts a resident may make, or limit residents to an approved list of friends and family.

It is desirable to increase communication for incarcerated individuals as a means for rehabilitation and re-introduction into society. Restricting these communications is considered a factor in the extremely high recidivism rate for incarcerated individuals in the United States in particular.

In recent years, many companies have incorporated modern technology such as personal computers (PCs), tablets, and mobile devices to secure communication platforms. Such technology offers a variety of communication options such as Video conferencing, Email, and Short Message Service (SMS) messaging. In many cases, this advance in technology has successfully increased communications at the facilities where they have been implemented.

In a secure facility, the process of managing two-way communications creates a significant challenge. Typically, PCs, mobile devices or tablets in these facilities are shared among many residents. Residents of secure facilities do not have a landline or cell phone number, so they cannot receive an incoming phone call. Similarly, because a resident does not have a cell phone account, a resident does not have the means to receive inbound SMS messages or Video calls.

SUMMARY OF DISCLOSURE

The current disclosure provides a system and method for the efficient management of two-way communications in a secure environment. The present disclosure provides a system and method to utilize a small set of telephone numbers or short codes to provide two-way communications for many residents in a secure facility. The system and method can be utilized for a variety of communications including phone calls, text messages, video calls, video chats, voicemail, video voicemail, and any other communication.

A system according to the present disclosure utilizes a variety of information including resident ID, device ID, Automatic Number Identification (ANI), called party number etc. to create a bridge for two-way communication where a resident does not have a dedicated telephone number, cell phone or any other dedicated communication device. A resident ID is typically a number assigned to a resident for identification purposes at the secure facility. A device ID is any unique number used to identify a device such as a cell phone, tablet, iPod, computer etc. An ANI is the telephone number or short code used by a resident for initiating communication. ANIs may be shared by numerous residents, across numerous shared devices, to facilitate communications.

To illustrate a practical use of an embodiment of the current disclosure, consider the Private Branch Exchange (PBX) systems commonly used in enterprise environments. When an employee utilizes a desk telephone to make a phone call to a customer, the company telephone number (ANI) is used to place the call. This telephone number would be shared by all employees of this enterprise. If the customer were to initiate communication to said enterprise utilizing this telephone number, the PBX system would answer the call and request an extension (or similar interaction) so that the communication may be routed to the correct employee at the company. Utilizing the current disclosure at said enterprise, the system would utilize additional information to recognize the employee at the company who had contacted this customer to automatically route the call to the employee, without the need for an extension. In addition, the communication would be routed to the employee's cell phone, computer, tablet, and desk phone simultaneously. If the employee were using a shared computer or tablet, a notification would appear on these devices requesting that the specific employee login to the device to receive the communication.

In addition, if a subsequent employee were to contact the same customer, programmed system logic of the current disclosure would cause the system to recognize a different employee had already contacted this customer using the standard company ANI (in this case telephone number) and therefore the system would use an alternate company ANI to initiate the communication. This alternate ANI could be used by the customer to directly contact the subsequent employee without the use of an extension.

Similarly, two-way communications from a secure facility may be routed in accordance with an embodiment of the current disclosure. Residents will use a list of standard ANI's owned by the company to communicate with contacts outside the secure facility using a variety of shared devices. These contacts may include friends, family members, attorneys, clergy etc. The residents will not be issued their own ANI for communication. The residents will not be required to own their own devices or have a dedicated cellular account. The system and logic included in the current disclosure may facilitate routing communications to the appropriate devices that the specific resident has permission to access.

Alternative systems currently exist such as that described in US2014/0334610A1 for inmate communications whereby each resident is assigned a designated ANI (telephone number) to facilitate two-way communications at a secure facility. The current system is superior in both efficiency and security.

A system and method according to the present disclosure offers a considerable economic advantage over other communication systems currently available. It is common for a provider of secure communications to be contracted at facilities totaling one hundred thousand (100,000) residents. With current available systems, each resident would require an individual, designated ANI at an average cost of $1 per month. In addition, it is common to experience up to ten percent (10%) resident turnover at secure facilities per day. At this rate, a provider would need at least four hundred thousand (400,000) ANIs to support one hundred thousand (100,000) residents. ANIs may not simply be reassigned because the previous resident's contacts would be attempting to contact the new resident. In addition, managing several hundred thousand ANIs requires a substantial investment in systems, processes and personnel to manage the data. ANI's must be procured, programmed, assigned, stored, paid for etc. by the organization. Utilizing a system according to the current disclosure, the same communications are facilitated with approximately twenty shared ANIs, which represents an estimated $4,799,760.00 in savings per year, in addition to the savings on infrastructure and personnel.

The present disclosure provides for several security advantages versus the currently available communication systems. When a telephone subscriber disconnects his or her telephone number, the telephone company does not simply reassign it. There is a specified cool down period to allow for the subscriber's contacts to stop calling the number. For the same reason, a secure communications provider should not simply continuously reassign their ANIs to new inmates. Given there is a limited number of available ANIs, this creates problems for a provider to manage the potential six million residents of secure facilities in the United States.

In addition, by controlling the communication on all devices utilizing the same limited set of ANIs, the current disclosure provides additional security. No called parties will know a resident's phone number, and therefore the phone number cannot be shared with anyone else. This process limits the potential for fraud and undesired communications between residents and called parties.

BRIEF DESCRIPTION OF THE DRAWINGS

A further understanding of the present disclosure can be obtained by reference to the embodiment set forth in the illustrations of the accompanying diagrams. The diagrams are not intended to limit the scope of this disclosure, which is set forth with particularity in the claims as appended or as subsequently amended, but merely to clarify and exemplify the disclosure.

For a more complete understanding of the present disclosure, reference is now made to the following drawings in which.

DETAILED DESCRIPTION

Figure 1:
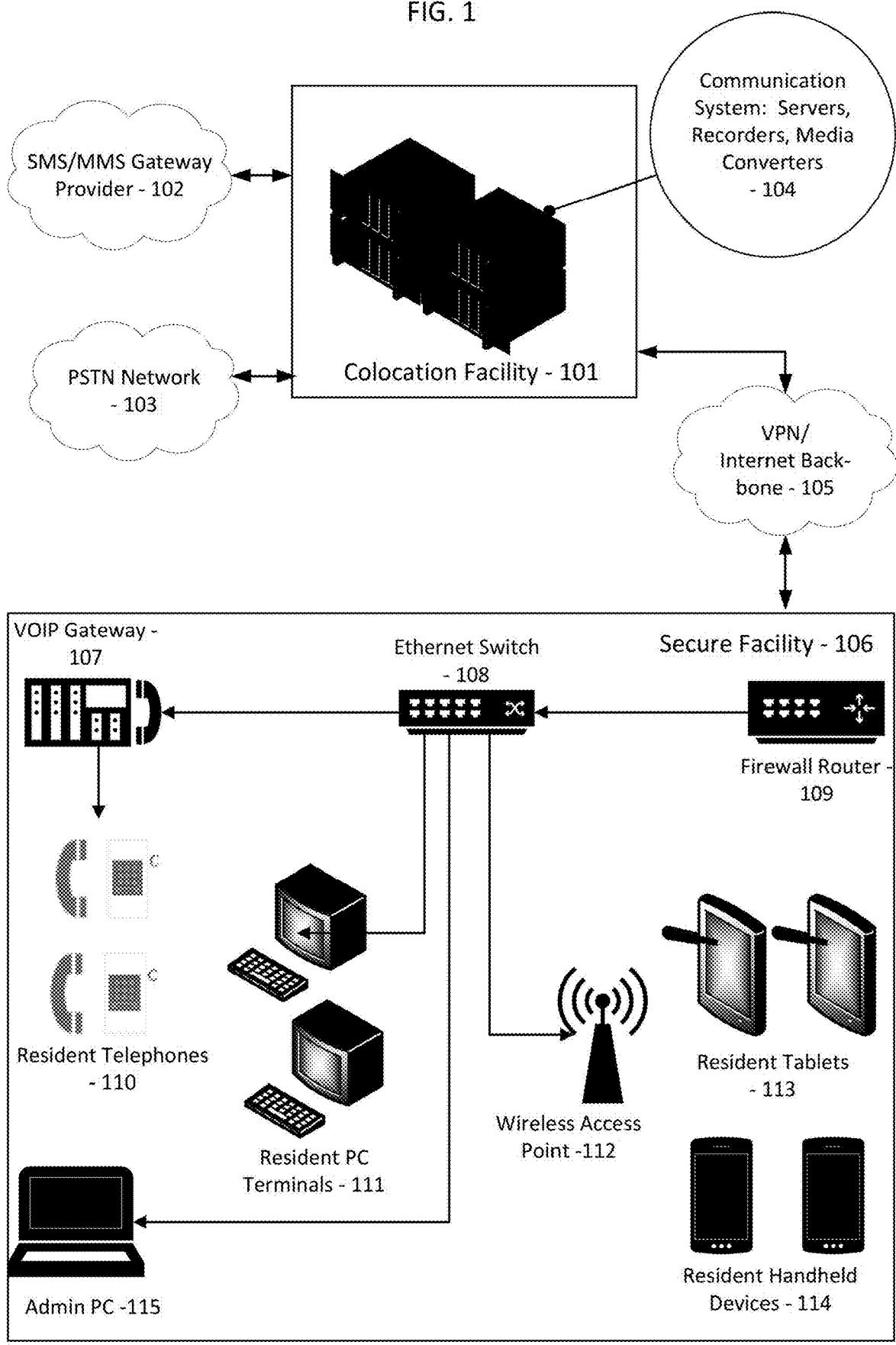
FIG. 1 depicts a diagram of a typical secure communication system utilizing a variety of communication devices and hosted in a Data Center.

The following is a detailed description with reference to the drawing figures. The specific structural and functional details disclosed herein are merely representative.

FIG. 1 is a basic network diagram of a modern secure communication system where the computer servers for controlling the system are hosted in a Data Center outside the secure facility. The present disclosure may also be used in a distributed architecture whereby computer equipment for controlling the system is located within the secure facility. In most cases, the present disclosure would be an integrated component of a communication system. The current disclosure may also exist as separate system attached to a secure communication system. FIG. 1 is merely an example of a call management system and is not intended to limit the scope of the present disclosure.

In FIG. 1, secure facility 106 represents a typical secure facility which normally includes several standard analog telephones 110, Resident PC Terminals 111, and a number of administrative workstations 115 connected to a Local Area Network (LAN) via ethernet switches 108. Telephones 110 may be connected to an analog telephone adaptive device 107, also known as a VOIP gateway, which converts analog telephone lines to VOIP for transport to a centralized or local communication system 104 via VPN/Internet backbone 105. Resident PC terminals 111 may be used for voice, video, and text-based communications. In addition, a wireless network may be used to connect devices via a Wireless Access Point (WAP) 112. Wireless devices may include resident tablets 113 or other resident handheld devices 114 such as cellphones, iPods, MP3 players or other similar devices. Resident tablets 113 and handheld devices 114 may be used for voice, video, and text-based communications. WAP 112 may transport communications to a firewall router 109 which provides access to the secure communication system 104 via VPN/Internet backbone 105. The communication equipment may be housed in a secure colocation facility 101 which may be leased or owned by the communications provider, or this may represent a cloud service such as Amazon cloud. Once communications are connected to the centralized communication system, all communication business rules such as blocking, recording, monitoring etc. may be performed. Telephone calls may then be transported via a Public Switched Telephone network 103, also known as PSTN. Text messages such as SMS messages and Multimedia Messaging Service (MMS) messages may be transported via an SMS/MMS gateway provider 102 and video-based communications may be transported via VPN/Internet backbone 105. The current disclosure may also facilitate inbound communication from the PSTN 103 for telephone calls, from the SMS/MMS gateway provider 102 for text-based communications, and from the VPN/Internet backbone 105 for video-based communications. Inbound communications may be transported to the residents in secure facility 106 via VPN/Internet backbone 105.

When a resident wishes to initiate communication, he or she picks up one of the analog telephones 103 or logs in to a PC terminal 111, tablet 113, or handheld device (114). Access to these devices requires identification information such as a Personal Identification Number (PIN), or a Resident ID. Identification of a resident may also include a biometric component such as secret code, secret Phrase, voice print, fingerprint, iris scan, etc. to confirm identity of the resident. Once the system verifies identity, the resident is given a menu of communication options.

Secure communication system 104 may include computer servers (including but not limited to virtual servers in cloud-based environments) having central processing units (CPUs) and memory modules configured to perform all functions of the secure communication system including recording, monitoring, biometric processing, call restricting, storing resident account information, executing logic for establishing two-way communications, storing data, etc. Secure communication system 104 may include a variety of networking equipment including routers, switches, and media converters for connections to VPN/Internet backbone 105, PSTN network 103, and the SMS/MMS gateway provider 102.

Figure 2A:
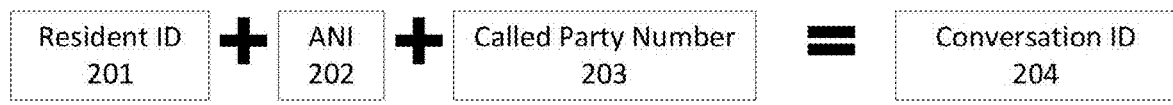
FIGS. 2A-2D depict how information may be grouped by the system to facilitate two-way communication to a resident ID.
Figure 2B:
Figure 2C:
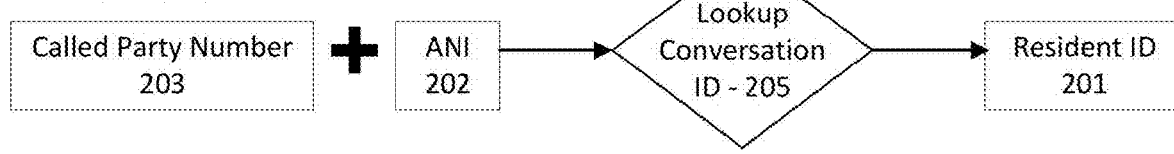
Figure 2D:
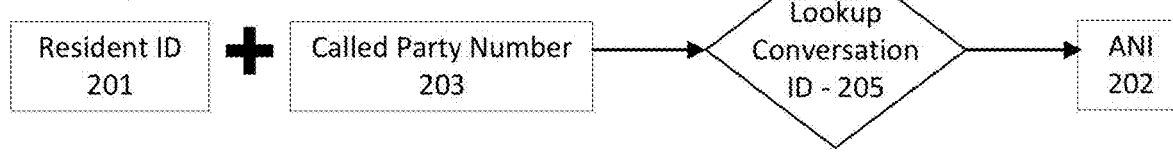

FIGS. 2A-2D depict an example of a method executable by secure communication system 104 by which secure two-way communication paths, herein referred to as conversation IDs, may be constructed according to an embodiment of the present disclosure to deliver secure two-way communications. FIGS. 2A-2D show only one example of a set of data that may be used to deliver secure two-way communications and the figures are not intended to limit the disclosure. There are four data components used in FIGS. 2A-2D. A resident ID 201 represents a unique number to identify a resident of a secure facility. An ANI 202 is one of a small set of shared telephone numbers used by residents of secure facility 106 to conduct two-way communications, and may be stored in system memory. A called party number 203 may be a telephone number associated with a friend, family member, clergy, etc. communicating with the resident. FIG. 2A shows a sum of the three data components 201, 202, and 203 may be calculated to provide a unique combination representing a conversation ID 204 which may be used to deliver secure two-way communications. Any combination of two of the data components 201, 202, and 203 may be used by the system to find the third data component 201, 202, or 203 to deliver communications. In FIGS. 2B-2D, the process block Lookup Conversation ID 205 represents programmed system logic in which the system uses two of the data components 201, 202, and 203 to find the third data component 201, 202, or 203. FIGS. 2B, 2C, and 2D show all possible combinations which may be used to join data components in this specific example set of data components. The process of utilizing these data combinations to deliver secure two-way communications will be further explained later in this disclosure.

Figure 3A:
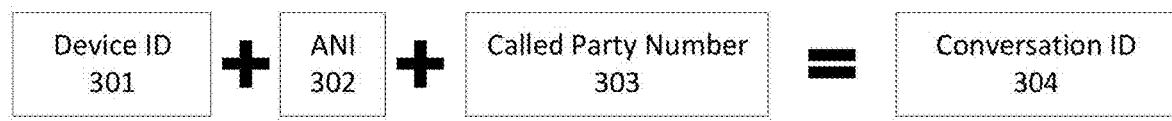
FIGS. 3A-3D depict how information may be grouped by the system to facilitate two-way communication to a device ID.
Figure 3B:
Figure 3C:
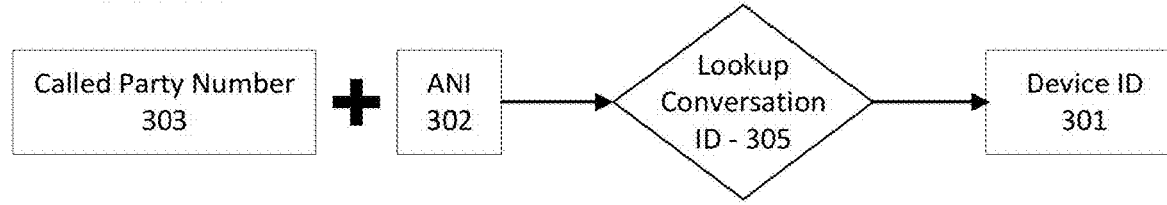
Figure 3D:
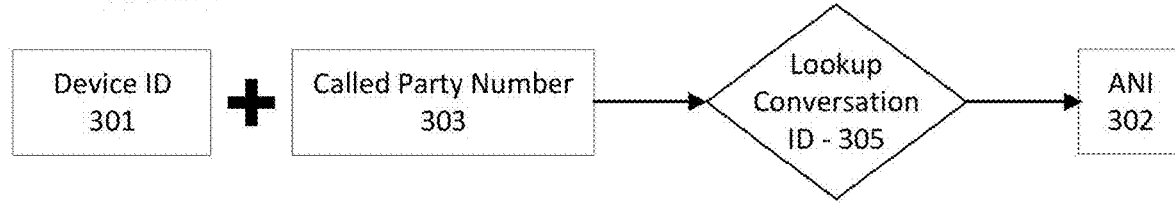

FIGS. 3A-3D depict another example of a method by which conversation IDs (secure two-way communication paths) may be constructed according to an embodiment of the present disclosure to deliver secure two-way communications. FIGS. 3A-3D show only one example of a set of data that may be used to deliver secure two-way communications and the figures are not intended to limit the disclosure. There are four data components used in FIGS. 3A-3D. A device ID 301 represents a unique number to identify a PC terminal 111, tablet 113, or handheld device 114 shared by residents of secure facility 106. An ANI 302 is one of a small set of shared telephone numbers used by the residents of secure facility 106 to conduct two-way communications. A called party number 303 is a telephone number associated with a friend, family member, clergy etc. communicating with the resident. FIG. 3A shows a sum of the three data components 301, 302, and 303 may be calculated to provide a unique combination representing a conversation ID 304 which may be used to deliver secure two-way communications. In this specific combination of data sets, device IDs 301 represent a subset of residents within the secure facility. A PC terminal 111 may only be accessible to the residents housed in proximity to the specific terminal. A PC terminal 111 on the second floor may not be accessible by first floor residents etc. Inbound communications for all second-floor residents may be delivered only to a specific subset of devices accessible by second floor residents. Any combination of two of the data components 301, 302, and 303 may be used by the system to find the third data component 301, 302, or 303 to deliver communications. In FIGS. 3B-3D, the process block Lookup Conversation ID 305 represents programmed system logic in which the system uses two of the data components 301, 302, and 303 to find the third data component 301, 302, or 303. FIGS. 3B, 3C, and 3D show all possible combinations which may be used to join data components in this specific example set of data components. The process of utilizing these data combinations to deliver secure two-way communications will be further explained later in this disclosure.

Figure 4A:
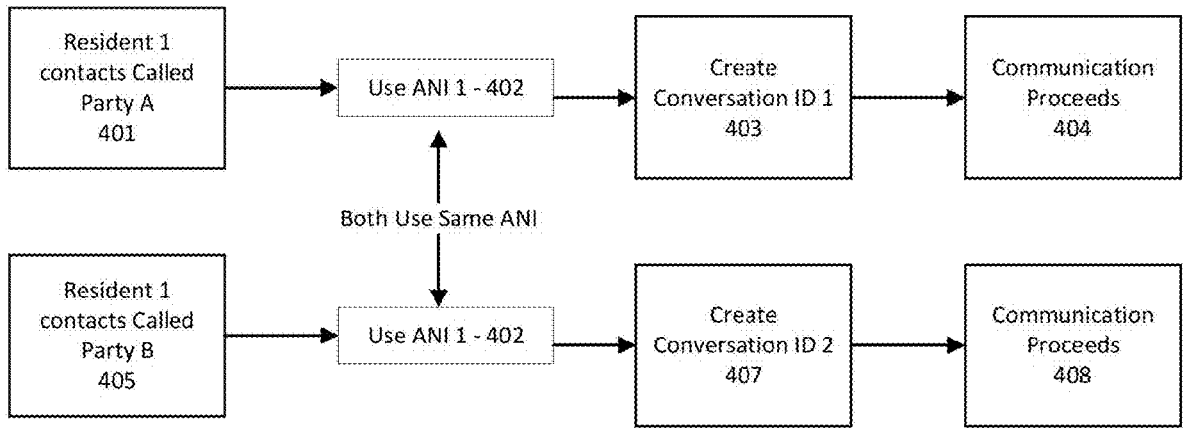
FIGS. 4A-4C depict a process that occurs as a single resident utilizes a single ANI for two-way communication to multiple parties.
Figure 4B:
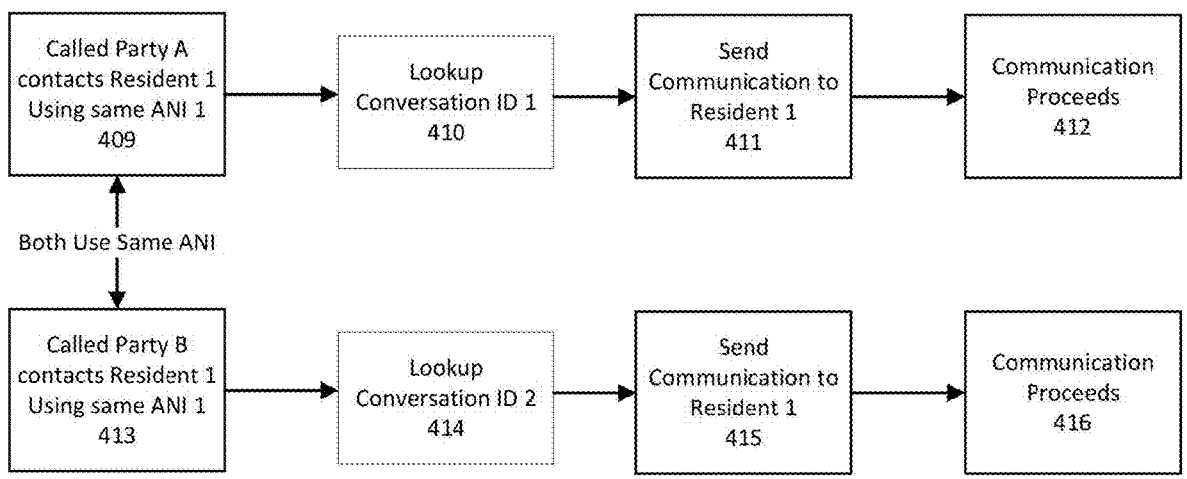
Figure 4C:
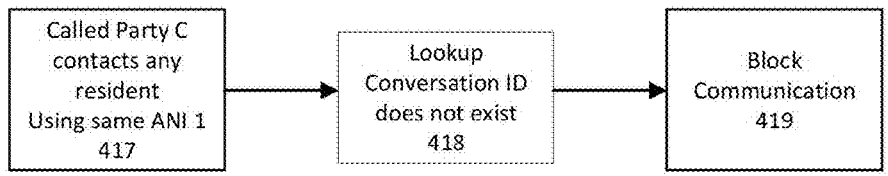

FIGS. 4A-4C further depict how conversation IDs may be created and used to deliver secure two-way communications in accordance with an embodiment of the present disclosure. Specifically, FIGS. 4A-4C demonstrate how one resident may communicate with multiple called parties using a single ANI. In FIG. 4A, blocks 401 and 405, a single resident (Resident 1) may initiate communications to two different called parties (Party A and Party B) having respective numbers. As shown in blocks 402, these communications will both utilize the same ANI from the system's limited set of ANI's. The system will combine the resident ID, the called party number, and the ANI to create a first conversation ID 403 (Conversation ID 1) and a second conversation ID 407 (Conversation ID 2), and store the data so that the information may be used later to deliver inbound communications to the appropriate resident utilizing the same ANI (ANI 1). As illustrated in FIG. 4B at blocks 409 and 413, the same two different called parties (Party A and Party B) may initiate communications to the same resident (Resident 1) using the same ANI (ANI 1). The system may take the data components available (called party number and ANI) and use them to lookup the respective conversation IDs, as illustrated by blocks 410 and 414, and to lookup the corresponding resident tied to the conversation IDs (Resident 1) to deliver both communications to the same resident. Using this same method, an unlimited number of residents can communicate with an unlimited number of called parties as long as no two residents contact the same called party.

Any resident initiating a communication with a unique called party will create a set of data components where any combination of two out of three data components is unique and can be used to route communication to the appropriate party by looking up the corresponding conversation ID. The system logic may also support multiple residents contacting the same called party, as will be described later herein with reference to FIGS. 5A-5C. FIG. 4C shows an unknown called party (Party C) initiating communication to the specified ANI (ANI 1) in block 417. As illustrated in blocks 418 and 419, the conversation lookup fails, and the communication is blocked, thereby controlling undesired communications into secure facility 106.

Figure 5A:
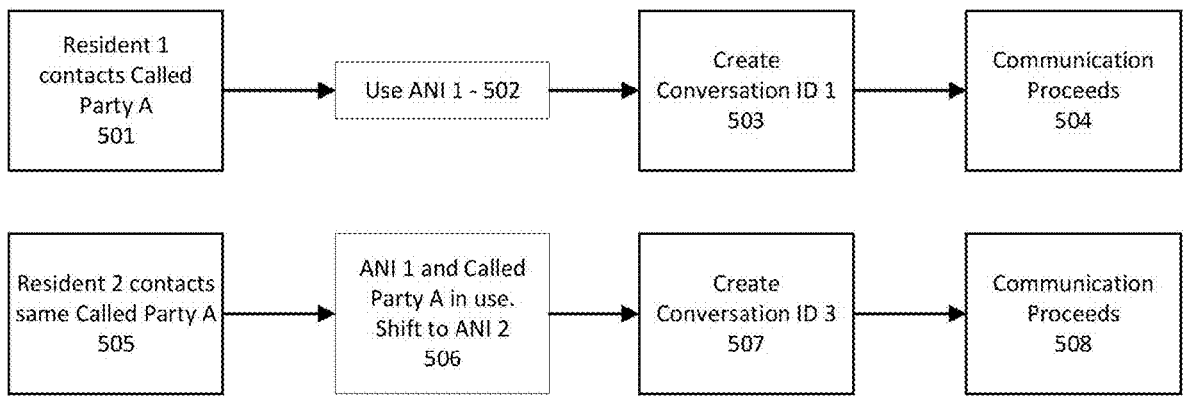
FIGS. 5A-5C depict the process that occurs as multiple residents utilizes multiple ANIs for two-way communication to the same party.
Figure 5B:
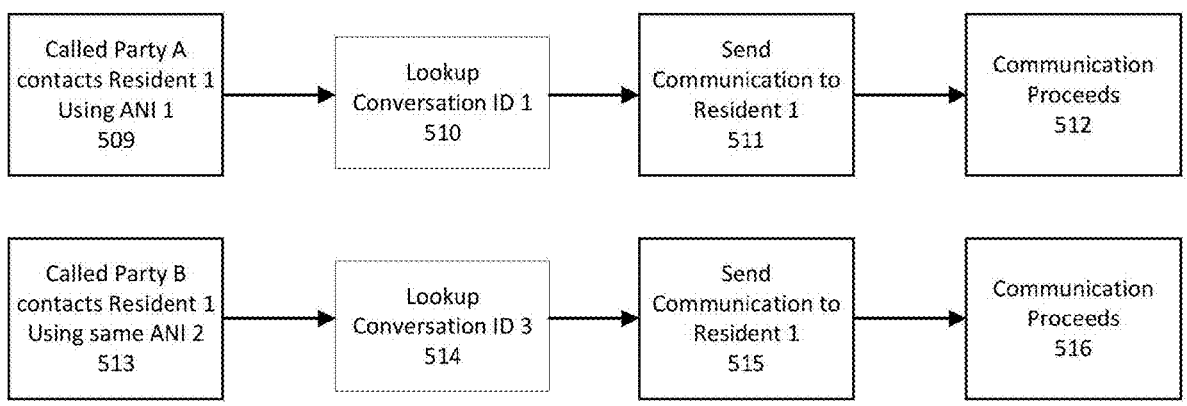
Figure 5C:
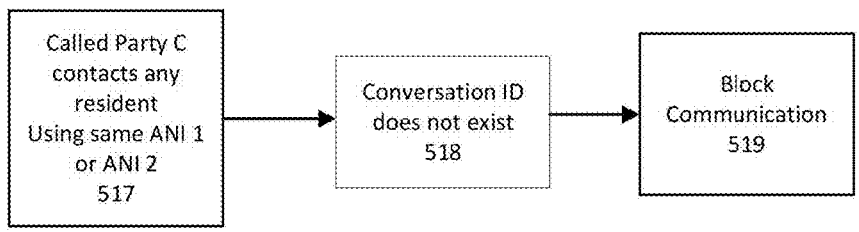

FIGS. 5A-5C further depict how conversation IDs may be created and used to deliver secure two-way communications in accordance with an embodiment of the present disclosure. Specifically, FIGS. 5A-5C demonstrate how the system facilitates multiple residents communicating with a single called party which requires the use of a different ANI. It is common for multiple residents within a secure facility to communicate with a single called party such as an attorney or social worker. This creates a challenge for two-way communication. In order for the system to function, every combination of two out of three data components must always be unique. In the scenario where multiple residents initiate communication to the same called party, they must use a different ANI to maintain the uniqueness of the data set combinations. In FIG. 5A, Resident 1 has initiated communication with Called Party A as shown in block 501, and the system uses ANI 1 as shown in block 502 to create a unique conversation ID 503 (Conversation ID 1) based on a resident ID, ANI and called party number where any combination of two out of these three data components is unique. Resident 2 initiates a subsequent communication with the same called party (Party A) as indicated in block 505. The system recognizes that the combination of ANI and called party number is already in use by another conversation ID and forces the use of a different ANI as indicated in block 506. As a result, the combination of called party number and ANI is again unique. Using this method, the system may facilitate two-way communication with a limited number of residents to the same called party. The number of residents that may communicate with the same called party will correspond to the number of unique ANIs accessible by the system. FIG. 5B shows a scenario in which both called Party A and called Party B initiate communications to the same resident (Resident 1) as shown in blocks 509 and 513. Called Party A utilizes ANI 1 and called Party B utilizes ANI 2, such that the system may lookup the unique conversation ID in blocks 510 and 514 corresponding to each communication and route both communications to Resident 1 according to blocks 511 and 515 despite the communications having come into the system on different ANIs. FIG. 5C illustrates an unknown called party (Party C) initiating communication to ANI 1 or 2 according to block 517. As indicated by blocks 518 and 519, the system logic determines that neither conversation ID exists, and therefore blocks the communications.

Figure 6:
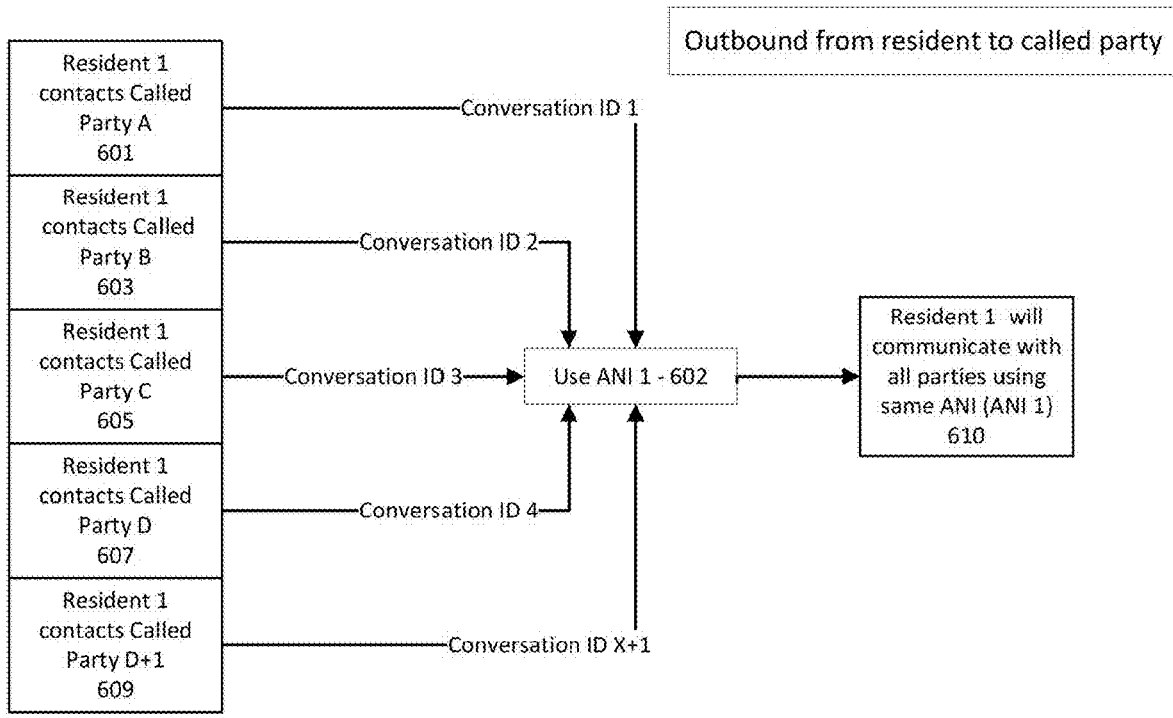
FIG. 6 is a diagram depicting how the system may use a single ANI to facilitate two-way communications between the same resident and multiple called parties.
Figure 6:
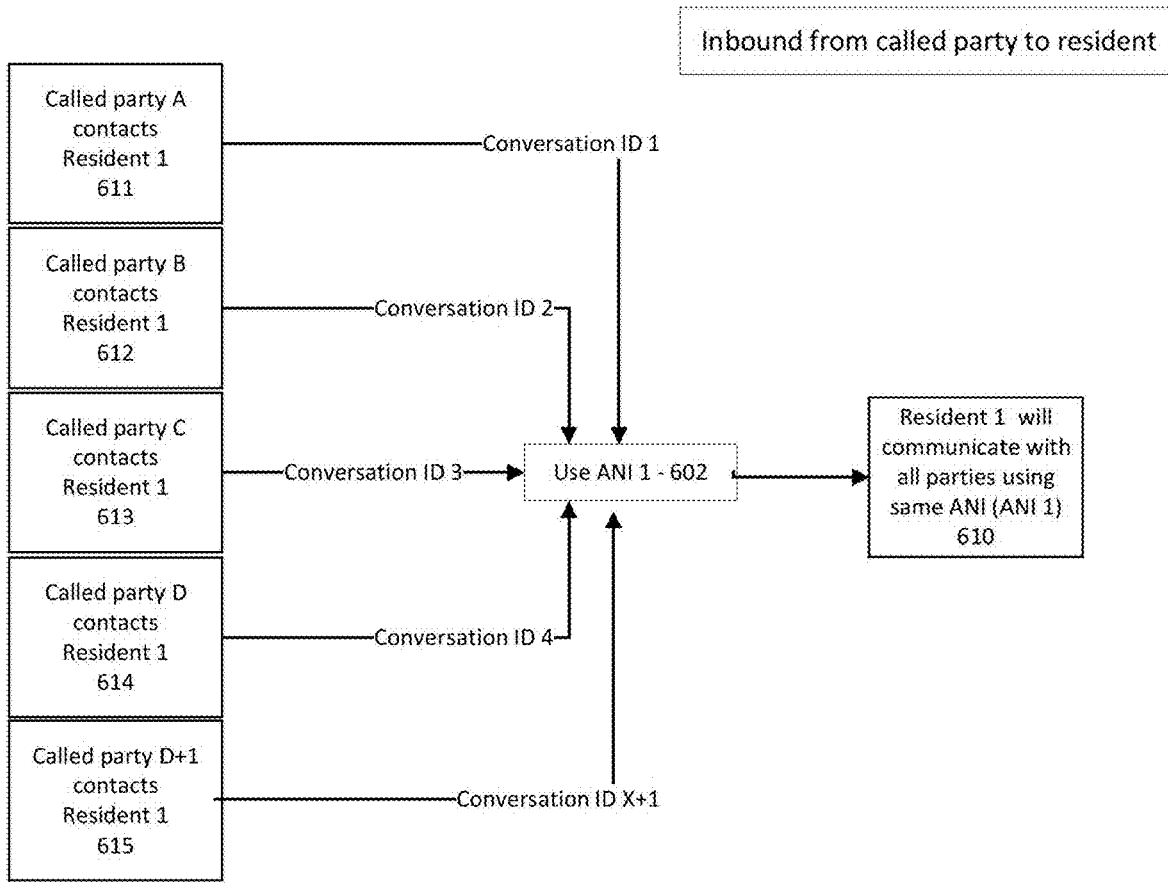

FIG. 6 further illustrates how two-way communication from a single resident (Resident 1) can initiate communications to unlimited called parties as indicated by blocks 601, 603, 605, 607, and 609 using a single ANI as indicated in block 602 by creating additional unique conversation IDs. As illustrated by blocks 611, 612, 613, 614, and 615, this process will allow unlimited called parties to reply to communications from the same resident utilizing a single ANI in conjunction with a corresponding unique conversation ID. Thus, in accordance with blocks 610, a single resident may communicate with several different called parties using a single ANI, regardless of whether the communications are outbound communications initiated by the resident or inbound reply communications initiated by the called parties.

Figure 7:
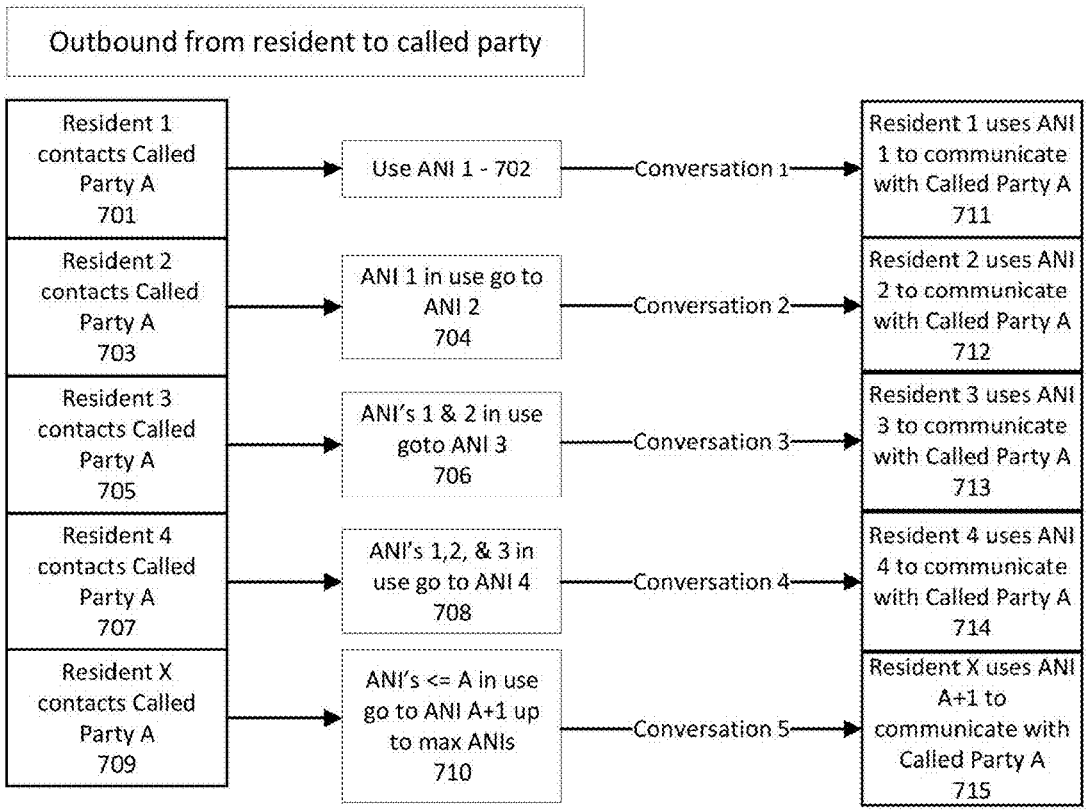
FIG. 7 is a diagram depicting how the system may use multiple ANIs to facilitate two-way communications between multiple residents to the same called party.

FIG. 7 further illustrates how two-way communications from multiple different residents may be initiated to the same called party as indicated in blocks 701, 703, 705, 707, and 709. The system will recognize as each ANI is in use and increment to a new unique ANI for each subsequent communication as shown in blocks 702, 704, 706, 708, and 710. This data will be stored in a respective unique conversation ID and the communication will proceed utilizing the corresponding ANI as illustrated in blocks 711, 712, 713, 714, and 715. Unique ANIs and conversation IDs may continue to increment for subsequent communications until the maximum number of unique ANIs has been reached (see block 710). Inbound communications from a single called party represented by blocks 716, 717, 718, 719, and 720 will each use a unique ANI to reach each different corresponding resident as shown in blocks 721, 722, 723, 724, and 725.

Figure 8:
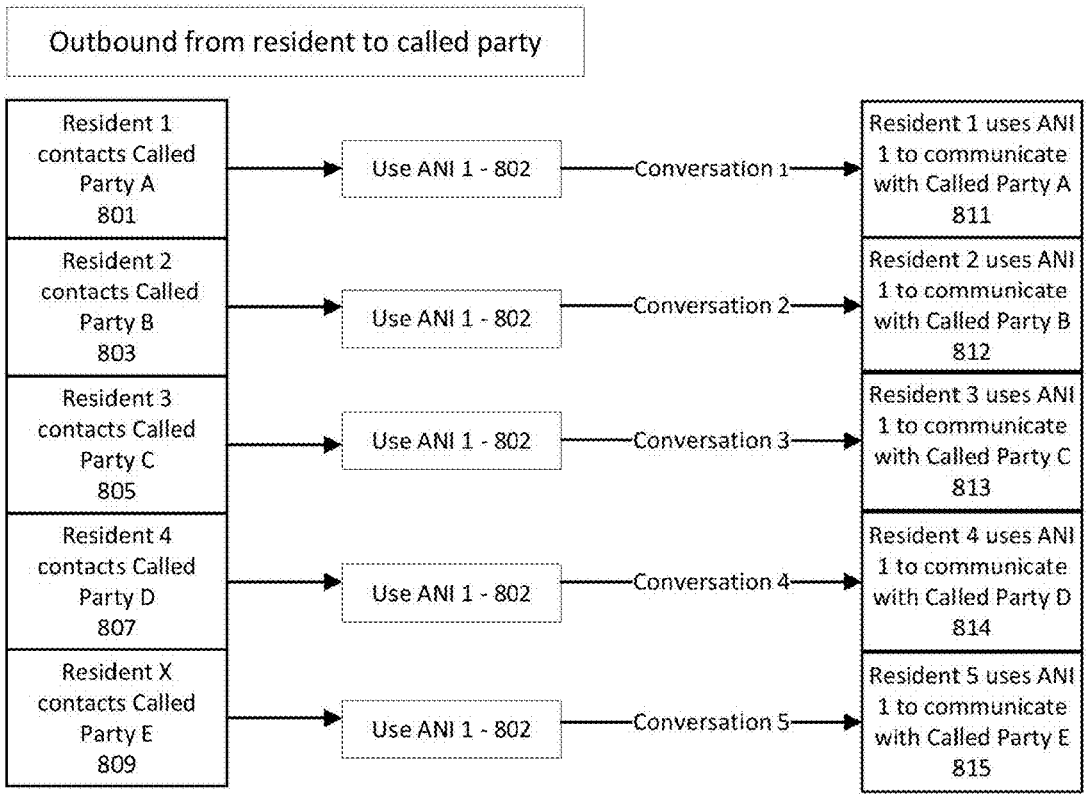
FIG. 8 is a flow chart depicting how the system may use a single ANI to facilitate two-way communications between multiple residents and multiple called parties.

FIG. 8 further illustrates how two-way communication from an unlimited number of residents may be facilitated to unlimited called parties using a single ANI as long as no two residents attempt to communicate with the same called party. Unlimited residents initiate communications to unlimited unique called parties in blocks 801, 803, 805, 807, and 809 using a single ANI as shown in block 802 by creating additional unique conversation IDs, thereby enabling respective communications according to blocks 811, 812, 813, 814, and 815. This process will allow unlimited called parties to return communications with the same resident as indicated by blocks 816, 817, 818, 819, and 820 utilizing a single ANI in conjunction with a unique conversation ID, and respective communications will be routed to the appropriate residents in accordance with blocks 821, 822, 823, 824, and 825.

Figure 9:
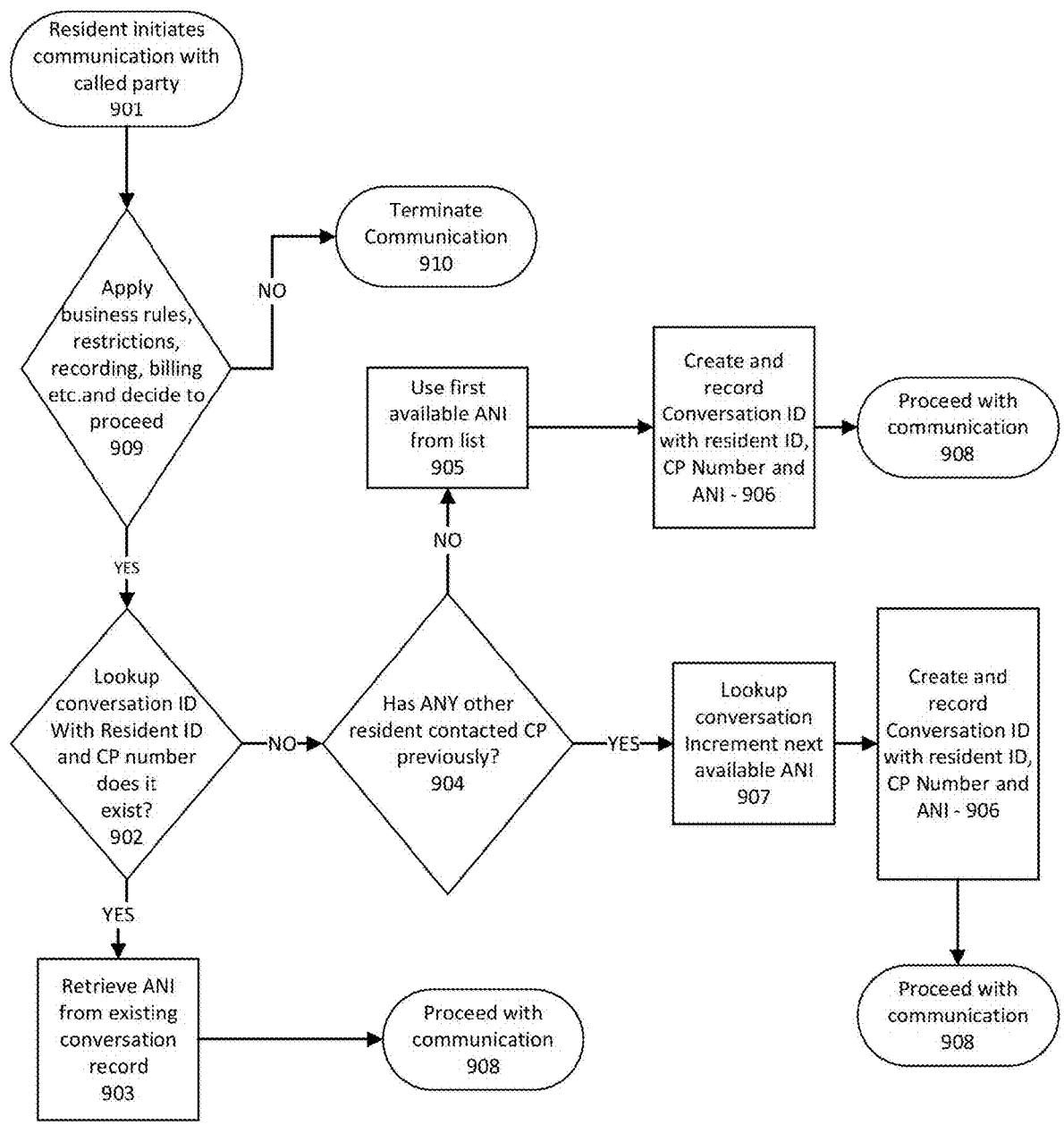
FIG. 9 is a flow chart depicting a process which may be used by the system to build communication channels when a resident initiates communication.

FIG. 9 is a flow chart illustrating an example of how the secure communications system may function. Specifically, FIG. 9 represents processing flow of a communication initiated by the resident. In block 901, the resident initiates communication with a called party via telephone, PC terminal, tablet or handheld for voice, video or text-based communication. In decision block 909, the secure communication system determines if the communication is permitted by applying appropriate business rules including but not limited to recording permissions, facility restrictions, rating, billing, time of day restrictions, etc. If, based on the business rules, the system determines that the communication should not proceed, the communication will be terminated as shown in block 910. If the system determines that the communication is allowed to proceed under the applicable business rules, the system would execute logic of the current disclosure to attempt to lookup a conversation ID utilizing the resident ID and the called party number as indicated in decision block 902. In other words, the system determines whether a conversation ID already exists for this unique combination resident ID and called party number. If a conversation ID already exists, the ANI from the existing conversation record would be retrieved and utilized in accordance with block 903 and the communication would proceed as indicated in block 908. However, if a matching conversation ID does not already exist, the system may proceed in decision block 904 to determine if any other resident had already initiated communication with the designated called party. If no resident had previously contacted this called party, the system would retrieve and use the first available ANI in the limited set of ANIs in accordance with block 905, create a new conversation ID with the unique data components of resident ID, called party number and ANI, and store the information in a database as indicated in block 906. Then, in block 908, the communication would proceed. If, in block 904, another resident had previously initiated communication with this called party, the system would proceed in accordance with block 907 to lookup the existing conversation ID to determine the associated ANI and then increment the ANI to the next available ANI from the limited number of ANIs. The system would then proceed to block 906 to create and store a new conversation ID with the unique data components of resident ID, called party number and ANI. Finally, in block 908, the communication would proceed.

Figure 10:
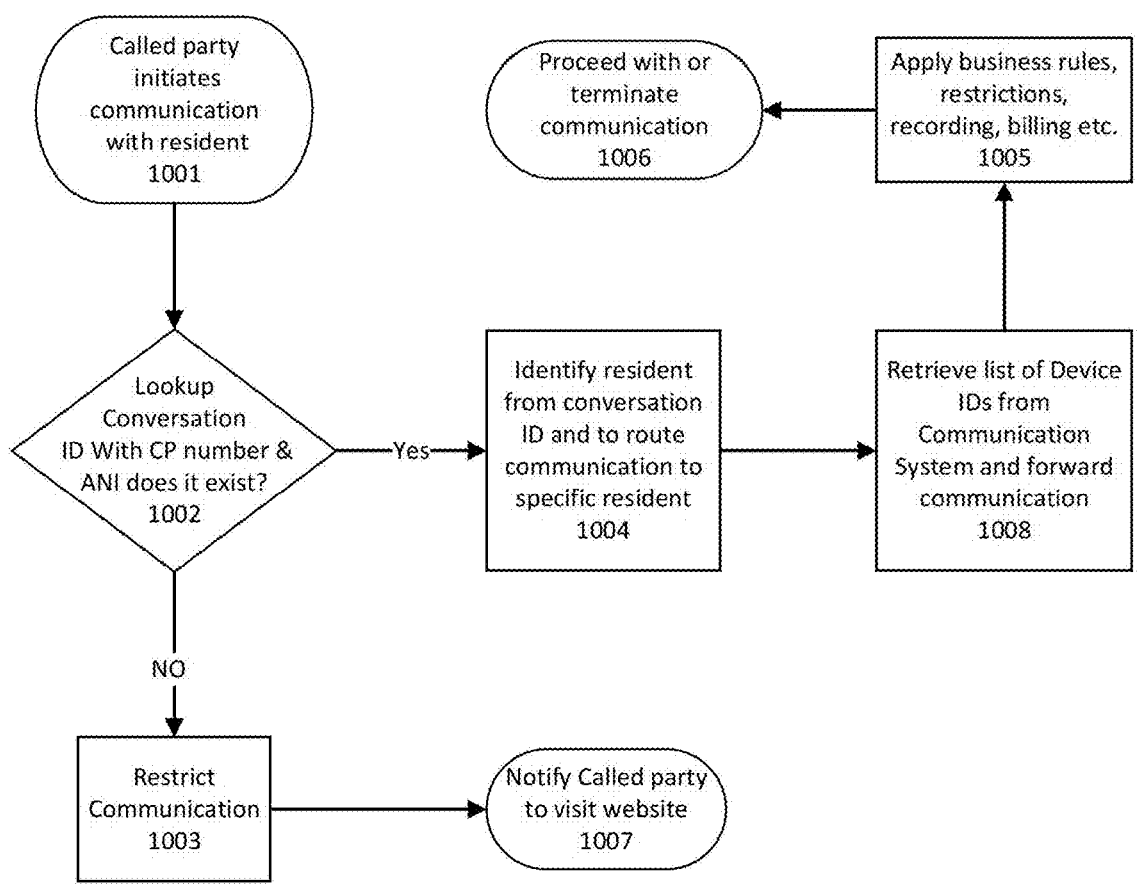
FIG. 10 is a flow chart depicting a process which may be used by the system to build communication channels when a called party initiates communication.

FIG. 10 is a flow chart illustrating another example of how the secure communications system may function. Specifically, FIG. 10 represents communications initiated by a called party to a resident. In block 1001, the called party initiates a communication to a resident via telephone, PC, cell phone, tablet or handheld for voice, video or text-based communication utilizing one of the system ANIs. In decision block 1002, the system executes logic of the current disclosure to attempt to lookup a conversation ID utilizing the known data components, namely called party number and ANI. In other words, the system determines whether a conversation ID already exists for this unique combination of called party number and ANI. If no existing conversation ID exists, the communication will be restricted in accordance with block 1003 and the called party will be directed to a website in block 1007 to request a conversation ID. This process will be further detailed in FIG. 11. If a conversation ID does exist, flow proceeds to block 1004 wherein the system executes logic of the current disclosure to lookup the conversation ID and retrieve the associated resident ID of the resident to whom the communication should be forwarded. The system will then determine which devices the resident has access to within the secure facility in accordance with block 1008. This determination may be based on stored information accessible by the secure communication system. In one embodiment, a list of device identifiers associated with the resident may be linked to the conversation ID. The communication system would then apply all business rules applicable to the secure facility including but not limited to recording permissions, facility restrictions, rating, billing, time of day restrictions, etc. in accordance with block 1005 and the communication would proceed or terminate in accordance with block 1006 based on application of the business rules of the secure communication system.

Figure 11:
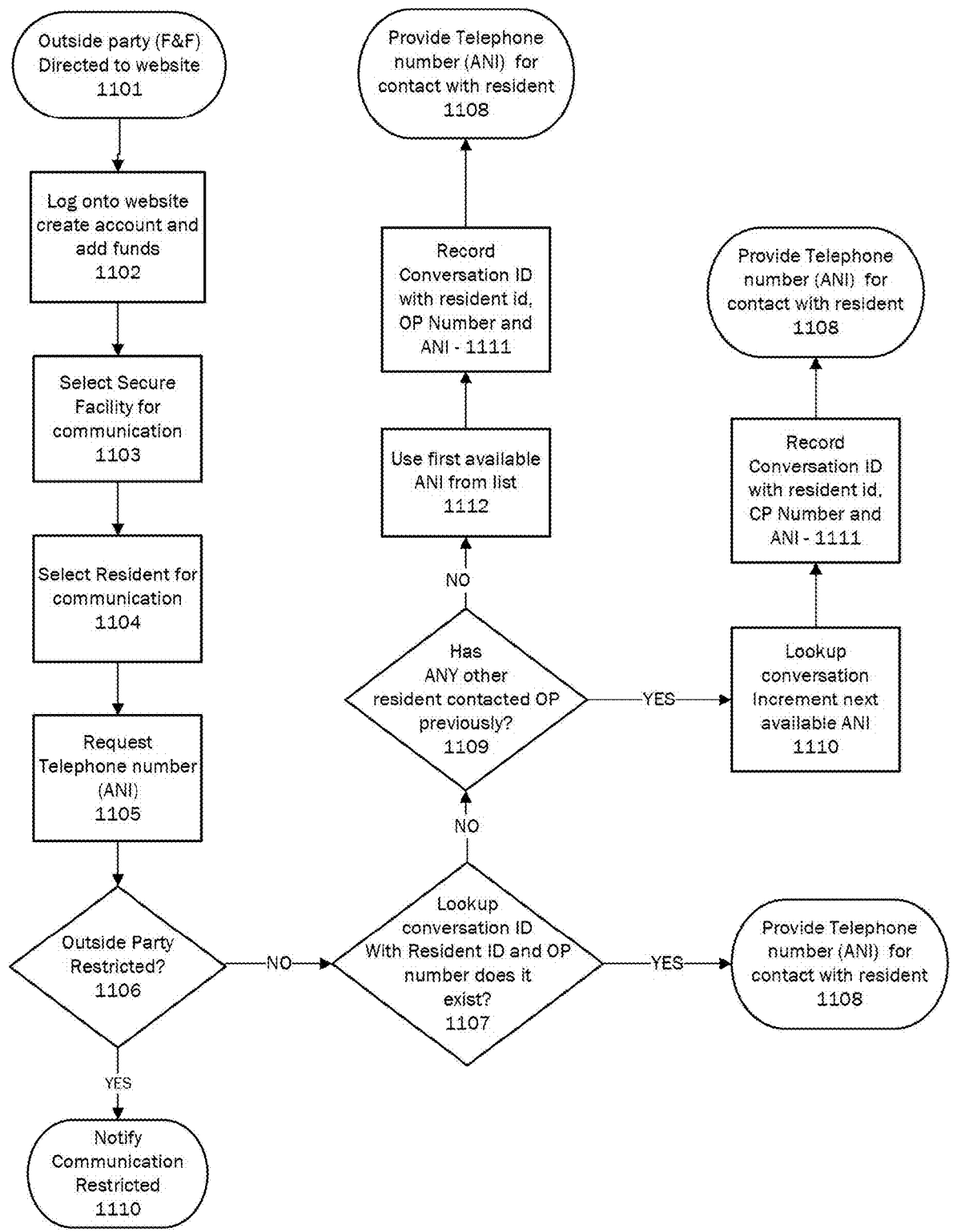
FIG. 11 is a flow chart depicting a process which may be used by the system to build communication channels when an outside party initiates communication with a resident and the resident has not first contacted the outside party.

FIG. 11 depicts a process whereby an outside party attempts to contact a resident prior to a conversation ID being created. The previous figures depict communications in which a resident first initiates the communication with a called party. As part of that process, a conversation ID is created and the called party receives a communication from an ANI which the called party may then use to respond to this communication with the resident. Outside parties which have not previously been called by a resident are not associated with a conversation ID. Outside parties are not connected to the secure communication system and therefore cannot be part of the conversation ID creation process by initiating a communication. For sake of simplicity, it is assumed an outside party does not know the resident's telephone number yet. In order for an outside party to initiate the initial communication, it is necessary for the outside party to request a conversation ID be created by contacting the secure communication provider, for example via a website. When an outside party is directed to the website pursuant to block 1101, the outside party must first login or create an account and add funds to the account for communication as indicated in block 1102. The outside party may then select the facility (block 1103) and the resident the outside party wishes to communicate with (block 1104), and request the telephone number (ANI) to be used to initiate communication (block 1105). In accordance with decision block 1106, the website will first determine whether the outside party has been restricted from communication by the facility, and if a restriction exists, the outside part will be notified that communication is restricted as indicated in 1110. If no restriction exists, the website will utilize the system of the current disclosure to attempt to lookup the conversation ID using the resident ID and the outside party's telephone number as shown in decision block 1107. If the conversation ID already exists, the system will provide the telephone number, which is one of the system ANIs, to the outside party pursuant as indicated in block 1108. If the conversation ID does not already exist, the system will verify in decision block 1109 whether any other resident has contacted this outside party number. If another resident previously contacted this outside party (i.e. the outside party is a called party), the system will lookup the ANI from the existing conversation and increment the ANI to the next available ANI in accordance with block 1110. The system will then record the new conversation ID with resident ID, called party number and ANI as shown in block 1111, and provide the ANI (telephone number) that the Called Party may use to initiate communication with the resident. If, at decision block 1109, no other residents have contacted the outside party number, the system will use the first available ANI from the list (block 1112), record the new conversation ID with resident ID, called party number and ANI (block 1111), and provide the ANI (telephone number) that the called party may use to initiate communication with the resident.

What is claimed is:

1. A system for enabling two-way communications between residents of a secure facility and outside parties who are not residents of the secure facility, the system comprising:
 memory including a limited number of unique Automatic Number Identifications (ANIs) stored therein;
 wherein the system is configured to receive a first outbound communication attempt from a first device used by a first resident to a device of a first outside party, wherein the first outbound communication attempt includes a unique first resident identifier associated with the first resident or a unique first device identifier associated with the first device, and wherein the first outbound communication attempt includes a first called party number associated with the device of the first outside party;
 wherein the system is further configured to use the first resident identifier or the first device identifier, and the first called party number, to attempt to find a first conversation identifier potentially stored in the system;
 wherein the system, upon finding the first conversation identifier, is further configured to extract an ANI from the first conversation identifier;
 wherein the system, upon failing to find the first conversation identifier, is further configured to retrieve an available ANI from the limited number of unique ANIs and generate a unique new conversation identifier based on the first resident identifier or the first device identifier, the retrieved ANI, and the first called party number, and to store the new conversation identifier as the first conversation identifier; and wherein the system is further configured to authorize a first outbound communication using the extracted ANI or the retrieved ANI as a first assigned ANI.

2. The system according to claim 1, wherein the system is further configured to receive a second outbound communication attempt from the first device used by the first resident to a device of a second outside party, wherein the second outbound communication attempt includes the first resident identifier or the first device identifier, and wherein the second outbound communication attempt includes a second called party number associated with the device of the second outside party, wherein the second outbound communication attempt is subsequent to the first outbound communication;

wherein the system is further configured to use the first resident identifier or the first device identifier, and the second called party number, to attempt to find a second conversation identifier potentially stored in the system;

wherein the system, upon failing to find the second conversation identifier, is further configured to generate another unique new conversation identifier based on the first resident identifier or the first device identifier, the first assigned ANI, and the second called party number, and to store the new conversation identifier as the second conversation identifier; and wherein the system is further configured to authorize a second outbound communication using the first assigned ANI.

3. The system according to claim 1, wherein the system is further configured to receive a second outbound communication attempt from a second device used by a second resident to the device of the first outside party, wherein the second outbound communication attempt includes a unique second resident identifier associated with the second resident or a unique second device identifier associated with the second device, and wherein the second outbound communication attempt includes the first called party number, wherein the second outbound communication attempt is subsequent to the first outbound communication;

wherein the system is further configured to use the second resident identifier or the second device identifier, and the first called party number, to attempt to find a second conversation identifier potentially stored in the system;

wherein the system, upon failing to find the second conversation identifier, is further configured to generate another unique new conversation identifier based on the second resident identifier or the second device identifier, the first assigned ANI, and the first called party number, and to store the new conversation identifier as the second conversation identifier; and wherein the system is further configured to authorize a second outbound communication using the first assigned ANI.

4. A method for enabling two-way communications between residents of a secure facility and outside parties who are not residents of the secure facility, the method comprising:

providing a limited number of unique Automatic Number Identifications (ANIs);

receiving a first outbound communication attempt from a first device used by a first resident to a device of a first outside party, wherein the first outbound communication attempt includes a unique first resident identifier associated with the first resident or a unique first device identifier associated with the first device, and wherein the first outbound communication attempt includes a first called party number associated with the device of the first outside party;

using the first resident identifier or the first device identifier, and the first called party number, to attempt to find a first conversation identifier potentially stored in a database;

upon finding the first conversation identifier, extracting an ANI from the first conversation identifier;

upon failing to find the first conversation identifier, retrieving an available ANI from the limited number of unique ANIs and generating a unique new conversation identifier based on the first resident identifier or the first device identifier, the retrieved ANI, and the first called party number, and storing the new conversation identifier as the first conversation identifier; and authorizing a first outbound communication using the extracted ANI or the retrieved ANI as a first assigned ANI.

5. The method according to claim 4, further comprising:

receiving a second outbound communication attempt from the first device used by the first resident to a device of a second outside party, wherein the second outbound communication attempt includes the first resident identifier or the first device identifier, and wherein the second outbound communication attempt includes a second called party number associated with the device of the second outside party, wherein the second outbound communication attempt is subsequent to the first outbound communication;

using the first resident identifier or the first device identifier, and the second called party number, to attempt to find a second conversation identifier potentially stored in the database;

upon failing to find the second conversation identifier, generating another unique new conversation identifier based on the first resident identifier or the first device identifier, the first assigned ANI, and the second called party number, and storing the another new conversation identifier as the second conversation identifier; and authorizing a second outbound communication using the first assigned ANI.

6. The method according to claim 4, further comprising:

receiving a second outbound communication attempt from a second device used by a second resident to the device of the first outside party, wherein the second outbound communication attempt includes a unique second resident identifier associated with the second resident or a unique second device identifier associated with the second device, and wherein the second outbound communication attempt includes the first called party number, wherein the second outbound communication attempt is subsequent to the first outbound communication;

using the second resident identifier or the second device identifier, and the first called party number, to attempt to find a second conversation identifier potentially stored in the database;

upon failing to find the second conversation identifier, generating another unique new conversation identifier based on the second resident identifier or the second device identifier, the first assigned ANI, and the first called party number, and storing the another new conversation identifier as the second conversation identifier; and authorizing a second outbound communication using the first assigned ANI.

7. A system for enabling two-way communications between residents of a secure facility and outside parties who are not residents of the secure facility, the system comprising:
   memory including a limited number of unique Automatic Number Identifications (ANIs) stored therein;
   wherein the system is configured to receive a first inbound communication attempt from a device of a first outside party to a device associated with a resident, wherein the first inbound communication attempt includes a first ANI from the limited number of unique ANIs and a first outside party number associated with the device of the first outside party;
   wherein the system is further configured to use the first ANI and the first outside party number to attempt to find a first conversation identifier potentially stored in a database;
   wherein the system, upon finding the first conversation identifier, is further configured to extract a resident identifier or a device identifier from the first conversation identifier, and to authorize a first inbound communication to the resident associated with the resident identifier or to the device associated with the device identifier using the first ANI; and
   wherein the system, upon failing to find the first conversation identifier, is further configured to restrict a first inbound communication based on the first inbound communication attempt.

8. The system according to claim 7, wherein the system is further configured to receive a second inbound communication attempt from a device of a second outside party to the device associated with the resident, wherein the second inbound communication attempt includes the first ANI and a second outside party number associated with the device of the second outside party;
   wherein the system is further configured to use the first ANI and the second outside party number to attempt to find a second conversation identifier potentially stored in the system;
   wherein the system, upon finding the second conversation identifier, is further configured to extract the resident identifier or the device identifier from the second conversation identifier, and to authorize a second inbound communication to the resident or to the device associated with the resident using the first ANI; and
   wherein the system, upon failing to find the second conversation identifier, is further configured to restrict a second inbound communication based on the second inbound communication attempt.

9. The system according to claim 7, wherein the system, upon failing to find the first conversation identifier, is further configured to receive a request from the first outside party to communicate with the resident, retrieve an available ANI from the limited number of unique ANIs, and provide the available ANI to the first outside party in response to the request.

10. The system according to claim 9, wherein the system is further configured to retrieve the resident identifier and determine whether the first outside party is restricted from communicating with the resident in response to the request, and the system is configured to provide the available ANI to the first outside party only if the first outside party is not restricted from communicating with the resident.

11. A method for enabling two-way communications between residents of a secure facility and outside parties who are not residents of the secure facility, the method comprising:
   providing a limited number of unique Automatic Number Identifications (ANIs);
   receiving a first inbound communication attempt from a device of a first outside party to a device associated with a resident, wherein the first inbound communication attempt includes a first ANI from the limited number of unique ANIs and a first outside party number associated with the device of the first outside party;
   using the first ANI and the first outside party number to attempt to find a first conversation identifier potentially stored in a database;
   upon finding the first conversation identifier, extracting a resident identifier or a device identifier from the first conversation identifier, and authorizing a first inbound communication to the resident associated with the resident identifier or to the device associated with the device identifier using the first ANI; and
   upon failing to find the first conversation identifier, restricting a first inbound communication based on the first inbound communication attempt.

12. The method according to claim 11, wherein the method further comprises:
   receiving a second inbound communication attempt from a device of a second outside party to the device associated with the resident, wherein the second inbound communication attempt includes the first ANI and a second outside party number associated with the device of the second outside party;
   using the first ANI and the second outside party number to attempt to find a second conversation identifier potentially stored in the database;
   upon finding the second conversation identifier, extracting the resident identifier or the device identifier from the second conversation identifier, and authorizing a second inbound communication to the resident or to the device associated with the resident using the first ANI; and
   upon failing to find the second conversation identifier, restricting a second inbound communication based on the second inbound communication attempt.

13. The method according to claim 11, wherein, upon failing to find the first conversation identifier, the method further comprises receiving a request from the first outside party to communicate with the resident, retrieving an available ANI from the limited number of unique ANIs, and providing the available ANI to the first outside party in response to the request.

14. The method according to claim 13, further comprising retrieving the resident identifier and determining whether the first outside party is restricted from communicating with the resident in response to the request, wherein the available ANI is provided to the first outside party only if the first outside party is not restricted from communicating with the resident.

* * * * *